(12) United States Patent
Johansen

(10) Patent No.: US 12,411,272 B2
(45) Date of Patent: Sep. 9, 2025

(54) DIFFRACTIVE OPTICAL ELEMENTS AND METHODS FOR MANUFACTURING DIFFRACTIVE OPTICAL ELEMENTS

(71) Applicant: NIL Technology ApS, Kongens Lyngby (DK)

(72) Inventor: Villads Egede Johansen, Copenhagen (DK)

(73) Assignee: NIL Technology ApS, Kongens Lyngby (DK)

( * ) Notice: Subject to any disclaimer, the term of this patent is extended or adjusted under 35 U.S.C. 154(b) by 0 days.

(21) Appl. No.: 18/030,168

(22) PCT Filed: Oct. 8, 2021

(86) PCT No.: PCT/EP2021/077836
§ 371 (c)(1),
(2) Date: Apr. 4, 2023

(87) PCT Pub. No.: WO2022/078892
PCT Pub. Date: Apr. 21, 2022

(65) Prior Publication Data
US 2023/0417964 A1   Dec. 28, 2023

Related U.S. Application Data

(60) Provisional application No. 63/091,553, filed on Oct. 14, 2020.

(51) Int. Cl.
G02B 5/18      (2006.01)

(52) U.S. Cl.
CPC .................... G02B 5/1866 (2013.01)

(58) Field of Classification Search
CPC ...... G02B 5/18; G02B 5/1823; G02B 5/1847; G02B 5/1861; G02B 5/1866; G02B 5/1876
See application file for complete search history.

(56) References Cited

U.S. PATENT DOCUMENTS

| 6,055,107 A | 4/2000 | Li et al. |
| 2016/0178358 A1* | 6/2016 | Miyasaka ............... G01B 11/25 |
| | | 359/558 |
| 2020/0116908 A1 | 4/2020 | Toyama |

FOREIGN PATENT DOCUMENTS

| CN | 103969724 | 8/2016 |
| CN | 111522190 | 8/2020 |
| EP | 0567995 | 11/1993 |

(Continued)

OTHER PUBLICATIONS

Cowan, "Aztec surface-relief volume diffractive structure," Journal of the Optical Society of America A, 1990, 7(8):1529-1544.

(Continued)

*Primary Examiner* — Kevin K Pyo
(74) *Attorney, Agent, or Firm* — Fish & Richardson P.C.

(57) ABSTRACT

Design techniques are described for diffractive optical elements that, at least in some instances, can permit the design of diffractive optical elements without high frequency features, or with a significantly reduced number of such features. Diffractive optical elements designed in accordance with the described techniques can, in some instances, be easier to manufacture and/or replicate.

11 Claims, 2 Drawing Sheets

(56) References Cited

FOREIGN PATENT DOCUMENTS

EP          2687877      1/2014
WO    WO 2019/164542    8/2019

OTHER PUBLICATIONS

International Preliminary Report on Patentability in International Appln. No. PCT/EP2021/077836, dated Apr. 13, 2023, 12 pages.
International Search Report and Written Opinion in International Appln. No. PCT/EP2021/077836, dated Jan. 21, 2022, 17 pages.
Walker et al., "Array generation with multilevel phase gratings," Journal of the Optical Society of America A, 1990, 7(8):1509-1513.

* cited by examiner

DIFFRACTIVE OPTICAL ELEMENTS AND METHODS FOR MANUFACTURING DIFFRACTIVE OPTICAL ELEMENTS

CROSS-REFERENCE TO RELATED APPLICATIONS

This application is a National Stage Application under 35 U.S.C. § 371 and claims the benefit of International Application No. PCT/EP2021/077836, filed Oct. 8, 2021, which claims priority to U.S. Application No. 63/091,553, filed Oct. 14, 2020, the disclosure of which is incorporated herein by reference.

FIELD OF THE DISCLOSURE

The present disclosure relates to diffractive optical elements (DOEs).

BACKGROUND

DOEs are optical components that are operable to modify an incident light's phase and/or amplitude to create a desired optical output pattern with a specified functionality. DOEs may have a structure composed, for example, of multiple levels, formed on the surface of a substrate. The pattern may be etched, for example, into the surface of a hard substrate or replicated in a polymer on the surface of a substrate or made purely in polymer. In some instances, the depth of the pattern may be on the order of the wavelength of the light, specific to the application, and adjusted to the refractive index of the material of the DOE.

DOEs can be mass-produced by various technologies, including replication processes. As an example, in an ultraviolet (UV) replication process, the surface topology of a master structure is duplicated into a thin film of a UV-curable replication material such as an UV-curable epoxy resin on top of a substrate. In some instances, a tool (i.e., a negative copy) may be prepared from a master, and the tool then is used to UV-replicate the epoxy resin.

SUMMARY

The present disclosure describes diffractive optical elements (DOEs) and methods for producing the DOEs.

For example, the disclosure describes an apparatus that includes a diffractive optical element. The diffractive optical element includes a multi-level structure having a plurality of peaks and composed of a material having a refractive index (RI). An angle $\theta$ is an angle between adjacent levels with respect to a particular one of the peaks, and a maximum value of $\theta$ for the levels associated with at least a particular percentage of the peaks in the multi-level structure is arctan (3.5×RI), wherein the particular percentage is sufficient to achieve a predetermined optical performance for the diffractive optical element.

In some implementations, the levels associated with at least 90% of the peaks in the multi-level structure have a maximum value of $\theta$ of arctan (3.5×RI).

The disclosure also describes an apparatus that includes a diffractive optical element having a smooth surface profile that has a plurality of peaks and is composed of a material having a refractive index (RI). A maximum slope of a tangent line on the surface profile forms an angle $\theta$ with respect to a planar bottom surface of the diffractive optical element, wherein $|\theta|$ is no greater than $\theta_{max}$=arctan (3.5× RI).

In some implementations, the apparatus includes a light emitter operable to produce light that passes through the diffractive optical element, wherein the light emitter has an operating wavelength $\lambda$, and a minimum distance between adjacent peaks in the multi-level structure is $\lambda$.

In some implementations, the apparatus includes a light sensor operable to detect light that passes through the diffractive optical element, wherein the light sensor has an operating wavelength $\lambda$, and a minimum distance between adjacent peaks in the multi-level structure is $\lambda$.

The present disclosure also describes an apparatus that includes a replication tool for replicating diffractive optical elements that are composed of a material having a refractive index (RI). The replication tool includes a multi-level structure having a plurality of peaks, where $\theta$ is an angle between adjacent levels with respect to a particular one of the peaks, and where a maximum value of $\theta$ for the levels associated, respectively, with at least 90% of the peaks in the multi-level structure is arctan (3.5×RI).

The present disclosure also describes method that include providing a replication tool and using the replication tool to form a plurality of diffractive optical elements.

Some implementations include one or more of the following advantages. For example, in some instances, the techniques permit the design of DOEs without high frequency features (or at least with a significantly reduced number of such features), but that can achieve the same or better performance as DOEs having high frequency features. DOEs designed in accordance with the techniques described here can, in some instances, be easier to manufacture and/or replicate.

Other aspects, features and advantages will be readily apparent form the following detailed description, the accompanying drawings, and the claims.

DETAILED DESCRIPTION

One of the initial tasks in fabricating DOEs is to determine a pixel or other layout design based on the desired optical performance and design criteria of the optical elements. In this context, a pixel refers to the smallest building block used when making the optical design. Typically, each pixel in the design can have, for example, a regular polygonal shape (e.g., rectangular or square) whose sides may have dimensions on the order of several hundred nanometers (nm) or less. The layout design can include the pixel layout corresponding to an individual DOE, as well as the overall layout for wafer-level production. The depth of the pixels in the DOE structure may differ from one another. Thus, the pixel layout design may include multiple levels, each of which corresponds to a different depth. In some instances there may be as many as four, eight or sixteen different levels, although the particular number of levels will depend on the optical performance and functionality needed for the particular application. The pixel layout design includes a respective pattern or other layout of pixels for each level, and can include, for example, microstructures and/or nanostructures. A master tool then is prepared based on the pixel layout design. Thus, the master tool can include a multi-level structured surface that corresponds to the pixel layout design. The structured surface can be transferred (e.g., by replication) to other materials.

For example, after the master tool is fabricated, the master tool can be used to manufacture one or more (negative) sub-masters or replicas, which in turn can be used directly or indirectly to replicate DOEs, for example, as part of a mass production manufacturing process. Manufacturing the DOEs may take place in some instances at a wafer-level in which tens, hundreds, or even thousands of DOEs are replicated in parallel using the same sub-master or other tool derived from the master. In some instances, a structured element of the master (or a sub-master) is replicated into liquid or plastically deformable material, then hardened to make it dimensionally stable, and the structured element (e.g., the DOE) is removed. These replicating, hardening and removing steps are repeated over different parts of a substrate to form replicas of the same structured element.

Examples of DOEs that can be manufactured using the master tool include diffraction and other gratings, beam splitters, beam shapers, collimators, diffractive diffusers, as well as other optical elements.

Figure 1:
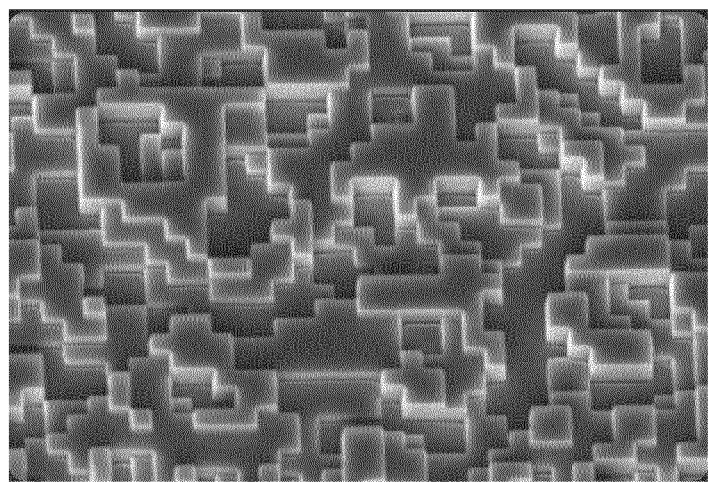
FIG. 1 shows an example of a DOE design that includes high frequency features.

When designing a multi-level (i.e., two or more) DOE for devices having field-of-view (FOV) or field-of-illumination (FOI) of 30° or more, high frequency features are sometimes incorporated in the design to achieve acceptable optical performance. In this context, "high frequency" refers to a pixel design that includes peaks in the multi-level structure that are relatively close together. As shown in the example of FIG. 1, the peaks typically tend to be relatively sharp with deep valleys or trenches between them. Such high frequency features can be difficult to manufacture and/or replicate.

The present disclosure describes approaches that permit the design of DOEs without high frequency features (or at least with a significantly reduced number of such features), but that can achieve the same or better performance as DOEs having high frequency features. DOEs designed in accordance with the techniques described here can, in some instances, be easier to manufacture and/or replicate.

In general, as described in greater detail below, DOEs can be designed by imposing a limitation on the maximum angle between adjacent levels (for a multi-level DOE structure) or by imposing a limitation on the maximum slope of the tangent line on the surface profile (for a DOE structure having a smooth surface profile).

Figure 2:
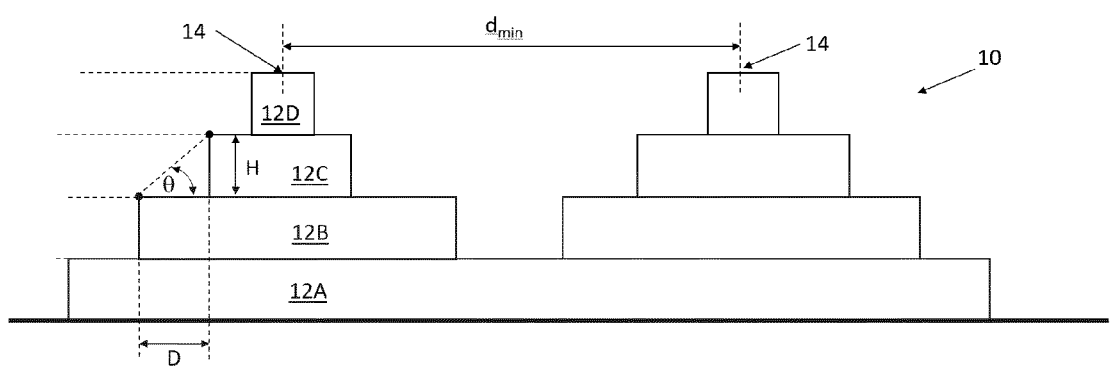
FIG. 2 illustrates an example of a multi-level DOE structure in accordance with the present disclosure.

For example, in some implementations, as illustrated in FIG. 2, the DOE 10 includes a multi-level (e.g., stepped) structure having N levels, where N is at least 2 (e.g., 4, 8, or 16), and $\theta_{max}$=arctan (3.5×RI), where $\theta$ is the angle between adjacent levels with respect to given peak 14 in the multi-level structure, and RI is the refractive index of the material of the DOE (i.e., at the operating wavelength). Examples of suitable materials for the DOE 10 include silicon, polysilicon, fused silica, aluminum oxide ($Al_2O_3$), metals, dielectrics, and/or semiconductors.

In the illustrated example of FIG. 2, N equals four. That is, the DOE structure shown in FIG. 2 has four levels 12A, 12B, 12C, 12N (collectively, levels 12). The DOE may be designed for integration into an optical device that is operable to emit or sense light at an operating wavelength $\lambda$. The minimum peak-to-peak distance ($d_{min}$) in the DOE structure 10 thus should be $\lambda$. Further, the height (H) of each individual level 12A ... 12N can be specified based on the number of levels (N), the operating wavelength ($\lambda$), and the refractive index (RI) so that each level causes a predetermined shift in the phase of the incident light. In particular:

$H=(1/N)\cdot[\lambda/(RI-1)]$.

As shown in the example of FIG. 2, each particular level 12A ... 12(N-1) associated with a given peak 14 has a larger footprint than the level(s) above it. In particular, the limitation on the maximum permissible angle ($\theta$) between adjacent ones of the levels 12A ... 12N translates to a minimum distance ($D_{min}$) by which each particular level 12A ... 12(N-1) extends laterally beyond the level immediately above it. For example, for a design in which a level extends orthogonally from the level beneath (i.e., so that the step from one level to the next makes a right triangle), a lower level (e.g., 12B) extends laterally a distance D beyond the next higher level (e.g., 12C), where D is equal to or greater than $D_{min}$, and where:

$$D_{min} = \frac{\lambda}{[3.5 \times N \times RI \times (RI-1)]}$$

As a specific example, for a 4-level DOE structure configured to operate at a wavelength of 850 nm with a refractive index of 1.5, H=425 nm and $D_{min}$=81 nm.

Although the height H of each level 12A ... 12N generally can be substantially the same as the height H of the other levels, the angle ($\theta$) between adjacent ones of the levels 12A ... 12N (as well as the distance D) can vary.

Further, while it may desirable for the levels associated with all the peaks 14 to satisfy the limitation of $\theta_{max}$=arctan (3.5×RI), in some implementations it is sufficient if the levels associated with at least 90% of the peaks 14 satisfy the foregoing limitation on $\theta_{max}$. Further, in some implementations, it is sufficient if the levels associated with at least a given percentage of the peaks 14 satisfy the foregoing limitation on $\theta_{max}$ such that the DOE achieves a specified (i.e., predetermined) optical performance level. In some instances, the given percentage may be less than 90%.

Figure 3:
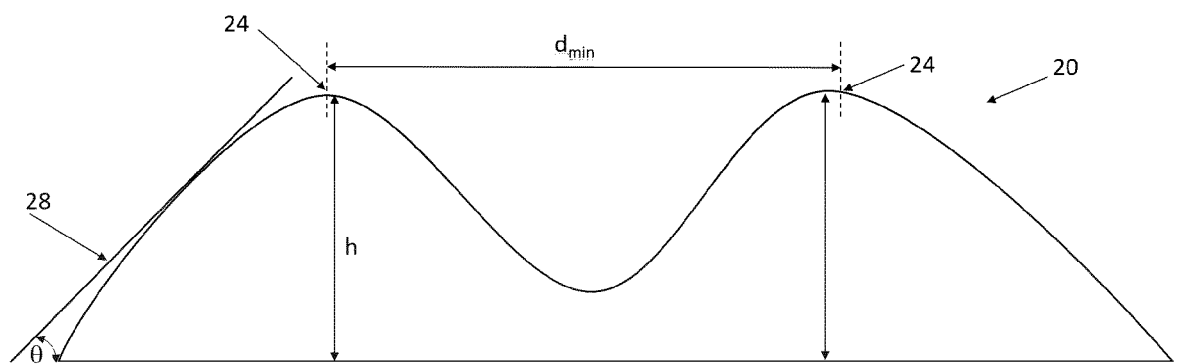
FIG. 3 illustrates an example of a DOE having a smooth surface profile in accordance with the present disclosure.

In other implementations, instead of a stepped or multi-level structure, the DOE has a smooth surface profile (e.g., where the levels are not discretized and where the smooth surface profile may be characterized, e.g., by a second order polynomial). FIG. 3 illustrates an example of a DOE 20 having such a smooth surface profile 22. In this case, the maximum permissible slope of a tangent line 28 on the surface profile forms an angle |θ| with respect to the planar bottom surface 26 of the DOE structure that is no greater than $\theta_{max}$=arctan (3.5×RI), where RI is the refractive index of the material of the DOE.

The DOE 20 may be designed for integration into an optical device that is operable to emit or sense light at an operating wavelength $\lambda$. The minimum distance ($d_{min}$) between peaks 24 in the DOE structure 20 thus should be $\lambda$. Further, the maximum height (h) of the DOE structure 20 should be h=[5×$\lambda$/(RI-1)], where RI is the refractive index of the material of the DOE structure (i.e., at the operating wavelength).

The foregoing criteria can be particularly advantageous, for example, for DOEs that have an FOV or FOI of at least 30° and can permit the design of the DOEs without high frequency features, yet still can enable the same or better optical performance as DOEs that have high frequency features. Consequently, the DOEs designed according to the present disclosure can, in some cases, be easier to manufacture and/or replicate. In particular, by avoiding the steep transitions and high aspect ratios that may be present in a DOE design that has high frequency features, the resulting DOEs made in accordance with the present disclosure can, in some instances, be produced such that they adhere more closely to the specified design.

The foregoing techniques design criteria apply not only to the DOEs themselves, but can be applied to a directly master (or sub-master) tool that is used as part of a mass production DOE manufacturing process. Thus, the master (or sub-master) tool can have a multi-level surface structure or a smooth surface profile that satisfies the limitations on θ max as set forth above. The master tool can be composed, for example, of silicon or fused silica and can be used to generate sub-masters, or to form the DOEs directly in a replication process. In some cases, generations of sub-masters are used for volume manufacturing by wafer level replication.

A master or other replication tool that has a multi-level surface structure or a smooth surface profile that satisfies the limitations on $\theta_{max}$ as set forth above can make it easier to replicate the DOEs because the transitions from one level in the DOE design are relatively gradual. Such a replication tool can in some cases, result in fewer defects in the replicated DOEs. Further, in some cases, the useful lifetime of the replication tool can be increased.

In some instances, an additive lithography process, for example, can be used to form the different levels for the design of the master tool. An additive lithographic technique allows for careful control of resist exposure and reflow processes for fabricating the master tool for complex, multi-level optical elements. The optical design can be transformed into a multilevel diffractive structure which then can be split into multiple masking patterns.

In some implementations, the additive lithographic technique includes depositing a first layer of resist (e.g., by spin coating) onto the upper surface of a wafer and, using a first mask, exposing the resist layer selectively by lithographic techniques, e.g., electron beam lithography (EBL). The exposed portions of the resist layer then are developed and removed such that selected regions of the wafer surface are no longer covered by the resist. Next, the wafer is etched, from the wafer surface, in the regions not covered by the resist to form openings down to a first depth. The remaining portions of the resist then can be removed. The foregoing steps can be repeated using additional layer(s) of resist and mask(s) to form the various levels in the DOE design. The combination of the various lithographic and etch processes results in regions at multiple different depths, which correspond to the different levels needed for the master tool. Details of the various masks used for the lithography and etch steps can be specified based on the modified pixel layout design. In this manner, a master tool can be fabricated that has a multi-level surface structure that satisfies the limitations on $\theta_{max}$ as set forth above.

Figure 4:
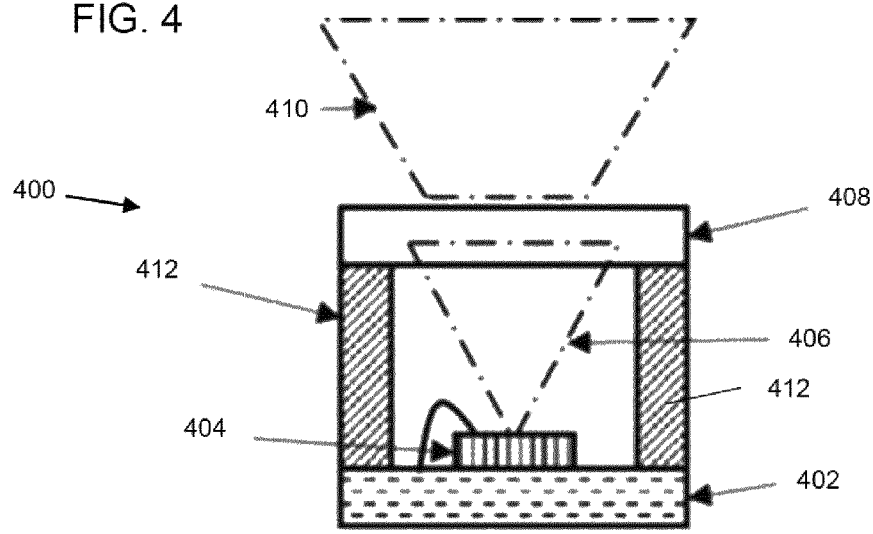
FIG. 4 illustrates an example of an optoelectronic module incorporating a DOE in accordance with the present disclosure.

In some implementations, DOEs as described in this disclosures may be integrated, for example, into optical or optoelectronic systems. As shown in FIG. 4, a module 400 includes a substrate 402 and a light-emitting component 404 coupled to or integrated into the substrate 402. The light-emitting component 404 may include, for example, a laser (for example, a vertical-cavity surface-emitting laser) or a light-emitting diode. Light (e.g., infra-red or visible) 406 generated by the light-emitting component 404 is transmitted through a housing and then to an optical device 408 (e.g., DOE 10 or The optical device 408 is operable to interact with the light 406, such that modified light 410 is transmitted out of the module 400. For example, the module 400, using the optical device 408, may produce one or more of structured light, diffused light, or patterned light. The housing may include, for example, spacers 412 separating the light-emitting component 404 and/or the substrate 402 from the optical device 408.

In some implementations, the module 400 of FIG. 4 is a light-sensing module (for example, an ambient light sensor), the component 404 is a light-sensing component (for example, a photodiode, a pixel, or an image sensor), the light 406 is incident on the module 400, and the light 410 is modified by the optical device 408. For example, the optical device 408 (e.g., DOE 10 or 20) may focus patterned light onto the light-sensing component 404. In some implementations, the module 400 may including both light-emitting and light-sensing components. For example, the module 400 may emit light that interacts with an environment of the module 400 and is then received back by the module 400, allowing the module 400 to act, for example, as a proximity sensor or as a three-dimensional mapping device. The modules described above may be part of, for example, time-of-flight cameras or active-stereo cameras. The modules may be integrated into systems, for example, mobile phones, laptops, television, wearable devices, or automotive vehicles.

The optical device 408 (e.g., DOE 10 or 20) may provide advantages to the module 400 compared to modules that do not include an optical device 408 as described in this disclosure. For example, the optical characteristics of the optical device 408 and the module 400 may be improved. In some instances, the module 400 may generate fewer optical artifacts and/or aberrations due to the optical device 408 thereby leading to enhanced optical efficiencies and/or performance.

Various aspects of the subject matter and the functional operations described in this specification (e.g., relating to the design and/or manufacture of the DOEs) can be implemented in digital electronic circuitry, or in computer software, firmware, or hardware, or in combinations of one or more of them. Thus, aspects of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The apparatus can include, in addition to hardware, code that creates an execution environment for the computer program in question, e.g., code that constitutes processor firmware.

Various modifications may be made within the spirit of this disclosure. Accordingly, other implementations also are within the scope of the claims.

What is claimed is:

1. An apparatus comprising:
    a diffractive optical element comprising a multi-level structure having a plurality of peaks and composed of a material having a refractive index (RI), where θ is an angle between adjacent levels with respect to a particular one of the peaks, and where, for at least 90% of the peaks in the multi-level structure, the levels associated with each peak of the at least 90% of the peaks have a maximum value of θ that is equal to arctan (3.5×RI), and
    wherein a maximum height (h) of the multi-level structure is [5×λ/(RI−1)], and wherein a distance by which each level extends beyond a next higher level is equal to or greater than $\lambda/(3.5 \times N \times RI \times (RI-1))$, where N is a total number of levels associated with each peak and is at least 2, and $\lambda$ is a wavelength of light.

2. The apparatus of claim 1 wherein the multi-level structure has N equal to 4, 8 or 16 levels.

3. The apparatus of claim 1 further including a light emitter operable to produce light that passes through the diffractive optical element, wherein the light emitter has an operating wavelength of $\lambda$, and a minimum distance between adjacent peaks in the multi-level structure is $\lambda$.

4. The apparatus of claim 1 further including a light sensor operable to detect light that passes through the diffractive optical element, wherein the light sensor has an operating wavelength of $\lambda$, and a minimum distance between adjacent peaks in the multi-level structure is $\lambda$.

5. An apparatus comprising:
a diffractive optical element comprising a multi-level structure having a plurality of peaks and composed of a material having a refractive index (RI), where $\theta$ is an angle between adjacent levels with respect to a particular one of the peaks, and where, for at least a minimum number of peaks in the multi-level structure, the levels associated with each peak of the minimum number of peaks have a maximum value of $\theta$ that is equal to arctan (3.5×RI), wherein the minimum number of peaks allows the diffractive optical element to achieve a predefined optical performance,
wherein a maximum height (h) of the multi-level structure is $[5 \times \lambda/(RI-1)]$, and
wherein a distance by which each level extends beyond a next higher level is equal to or greater than $\lambda/(3.5 \times N \times RI \times (RI-1))$, where N is a total number of levels associated with each peak and is at least 2, and $\lambda$ is a wavelength of light.

6. An apparatus comprising:
a replication tool for replicating diffractive optical elements that are composed of a material having a refractive index (RI), wherein the replication tool comprises a multi-level structure having a plurality of peaks, where $\theta$ is an angle between adjacent levels with respect to a particular one of the peaks, and where, for at least 90% of the peaks in the multi-level structure, the levels associated with each peak of the at least 90% of the peaks have a maximum value of $\theta$ that is equal to arctan (3.5×RI),
wherein a maximum height (h) of the multi-level structure is $[5 \times \lambda/(RI-1)]$, and
wherein a distance by which each level extends beyond a next higher level is equal to or greater than $\lambda/(3.5 \times N \times RI \times (RI-1))$, where N is a total number of levels associated with each peak and is at least 2, and $\lambda$ is a wavelength of light.

7. The apparatus of claim 6 wherein the multi-level structure has 4, 8 or 16 levels.

8. The apparatus of claim 6 wherein the angle $\theta$ between a first pair of the levels differs from the angle $\theta$ between a second pair of levels associated with a particular one of the peaks.

9. A method comprising
providing a replication tool; and
using the replication tool to form a plurality of diffractive optical elements, each of the diffractive optical elements comprising a multi-level structure having a plurality of peaks and composed of a material having a refractive index (RI), where $\theta$ is an angle between adjacent levels with respect to a particular one of the peaks, and where, for at least 90% of the peaks in the multi-level structure, the levels associated with each peak of the at least 90% of the peaks have a maximum value of $\theta$ that is equal to arctan (3.5×RI),
wherein a maximum height (h) of the multi-level structure is $[5 \times \lambda/(RI-1)]$, and
wherein a distance by which each level extends beyond a next higher level is equal to or greater than $\lambda/(3.5 \times N \times RI \times (RI-1))$, where N is a total number of levels associated with each peak and is at least 2, and $\lambda$ is a wavelength of light.

10. The method of claim 9 wherein the multi-level structure has 4, 8 or 16 levels.

11. The method of claim 9 wherein the angle $\theta$ between a first pair of the levels differs from the angle $\theta$ between a second pair of levels associated with a particular one of the peaks.

* * * * *